(12) United States Patent
Stewart et al.

(10) Patent No.: US 11,034,196 B2
(45) Date of Patent: Jun. 15, 2021

(54) TIRE SENSOR LOCATION METHOD AND APPARATUS

(71) Applicant: Schrader Electronics Limited, Antrim (GB)

(72) Inventors: William David Stewart, Antrim (GB); Alan Murphy, Annahilt (GB); Stephen Robb, Crumlin (GB)

(73) Assignee: SCHRADER ELECTRONICS LIMITED, Antrim (GB)

(*) Notice: Subject to any disclaimer, the term of this patent is extended or adjusted under 35 U.S.C. 154(b) by 0 days.

(21) Appl. No.: 16/177,162

(22) Filed: Oct. 31, 2018

(65) Prior Publication Data
US 2019/0126694 A1    May 2, 2019

(30) Foreign Application Priority Data
Oct. 31, 2017  (GB) ..................... 1717964

(51) Int. Cl.
*B60C 23/04*  (2006.01)
*B60C 23/00*  (2006.01)

(52) U.S. Cl.
CPC ........ *B60C 23/0452* (2013.01); *B60C 23/007* (2013.01); *B60C 23/0461* (2013.01); *B60C 23/0472* (2013.01); *B60C 23/0479* (2013.01); *B60C 23/0494* (2013.01)

(58) Field of Classification Search
CPC ............ B60C 23/0447; B60C 23/0461; B60C 23/0472; B60C 23/0418; B60C 23/0416; B60C 23/0428; B60C 23/0479; B60C 23/006; B60C 23/0406; B60C 23/0488; B60C 23/061; B60C 23/0459
See application file for complete search history.

(56) References Cited

U.S. PATENT DOCUMENTS

| 4,479,245 | A | * | 10/1984 | Batlivala | ............ | H04B 7/15542 |
| | | | | | | 375/311 |
| 5,163,320 | A | * | 11/1992 | Goshima | ............. | B60C 23/0428 |
| | | | | | | 301/64.701 |
| 5,682,381 | A | * | 10/1997 | Sekihata | ........... | H04W 72/1231 |
| | | | | | | 370/332 |
| 7,506,540 | B1 | * | 3/2009 | Job | ..................... | B60C 23/0416 |
| | | | | | | 73/146.5 |

(Continued)

FOREIGN PATENT DOCUMENTS

DE    102006039519 B3    8/2006

OTHER PUBLICATIONS

United Kingdom Search Report, Application No. GB1717964.9, dated Apr. 12, 2018.

*Primary Examiner* — Hoi C Lau
(74) *Attorney, Agent, or Firm* — Holland & Hart LLP

(57) ABSTRACT

A method of locating a wheel-mounted electronic device, such as a tire pressure monitoring device. A wireless signal is transmitted from an interrogation device from each of a plurality of interrogation locations. The signals are received by the wheel-mounted device and received signal strength is measured for each interrogation location. The wheel-mounted device then transmits, in respect of each interrogation location, a wireless signal indicating the measured signal strength. These signals are received by the interrogation device which determines from them a location of the wheel-mounted device with respect to a wheel.

26 Claims, 7 Drawing Sheets

(56) References Cited

U.S. PATENT DOCUMENTS

| | | | | |
|---|---|---|---|---|
| 8,013,726 B2* | 9/2011 | Desai | ................. | B60C 23/0435 340/447 |
| 2002/0075144 A1* | 6/2002 | DeZorzi | ............. | B60C 23/0408 340/442 |
| 2003/0030553 A1* | 2/2003 | Schofield | ............ | B60C 23/0416 340/442 |
| 2006/0006992 A1* | 1/2006 | Daiss | ................. | B60C 23/0416 340/442 |
| 2006/0012469 A1* | 1/2006 | Hirai | .................. | B60C 23/0416 340/445 |
| 2006/0139158 A1* | 6/2006 | Miller | ................. | B60C 23/0418 340/445 |
| 2008/0157950 A1* | 7/2008 | Mori | .................. | B60C 23/0416 340/438 |
| 2009/0079652 A1* | 3/2009 | Kawase | ............. | B60C 23/0408 343/788 |
| 2009/0121858 A1* | 5/2009 | Desai | ...................... | B60R 25/24 340/447 |
| 2009/0183979 A1* | 7/2009 | Lohndorf | ........... | B60C 23/0488 200/85 R |
| 2010/0039262 A1* | 2/2010 | Cameron | ................ | B66C 13/16 340/568.1 |
| 2011/0106464 A1* | 5/2011 | Petrucelli | ............ | B60C 23/0496 702/50 |
| 2011/0304442 A1* | 12/2011 | Lickfelt | .............. | B60C 23/0418 340/10.33 |
| 2013/0222128 A1* | 8/2013 | Watabe | ............... | B60C 23/0416 340/447 |
| 2013/0328674 A1* | 12/2013 | McIntyre | .............. | B60C 23/007 340/442 |
| 2014/0091918 A1* | 4/2014 | Pfeffer | .................. | F16D 66/026 340/454 |
| 2014/0150543 A1* | 6/2014 | Shima | ................. | B60C 23/0459 73/146 |
| 2014/0167950 A1* | 6/2014 | Shima | ................. | B60C 23/0447 340/447 |
| 2014/0172241 A1* | 6/2014 | Shima | ................. | B60C 23/0416 701/49 |
| 2015/0057873 A1* | 2/2015 | Lammers | ............ | B60C 23/0488 701/29.7 |
| 2015/0352912 A1* | 12/2015 | Lehmann | ............ | B60C 23/0472 340/442 |
| 2016/0075306 A1* | 3/2016 | Utter | ................... | B60C 23/0408 340/426.31 |
| 2016/0114636 A1* | 4/2016 | Terada | ................ | B60C 23/0489 73/146.5 |
| 2016/0309537 A1* | 10/2016 | Hart | ...................... | H04W 76/18 |
| 2016/0311273 A1* | 10/2016 | Zaroor | ................ | B60C 23/0479 |
| 2017/0174014 A1* | 6/2017 | Stewart | ............... | B60C 23/0447 |
| 2017/0363515 A1* | 12/2017 | Poloni | ................... | B60C 23/061 |
| 2018/0111430 A1* | 4/2018 | Muddiman | ......... | B60C 23/0416 |
| 2018/0304702 A1* | 10/2018 | Urano | ..................... | B60R 11/02 |
| 2018/0361803 A1* | 12/2018 | Saburi | ................ | B60C 23/0416 |
| 2019/0126694 A1* | 5/2019 | Stewart | ............... | B60C 23/0461 |
| 2019/0152277 A1* | 5/2019 | Hassani | .............. | B60C 23/0418 |
| 2019/0225034 A1* | 7/2019 | Van Wiemeersch | ........................ | B60C 23/0455 |
| 2019/0329606 A1* | 10/2019 | Stewart | ............... | B60C 23/0489 |

* cited by examiner

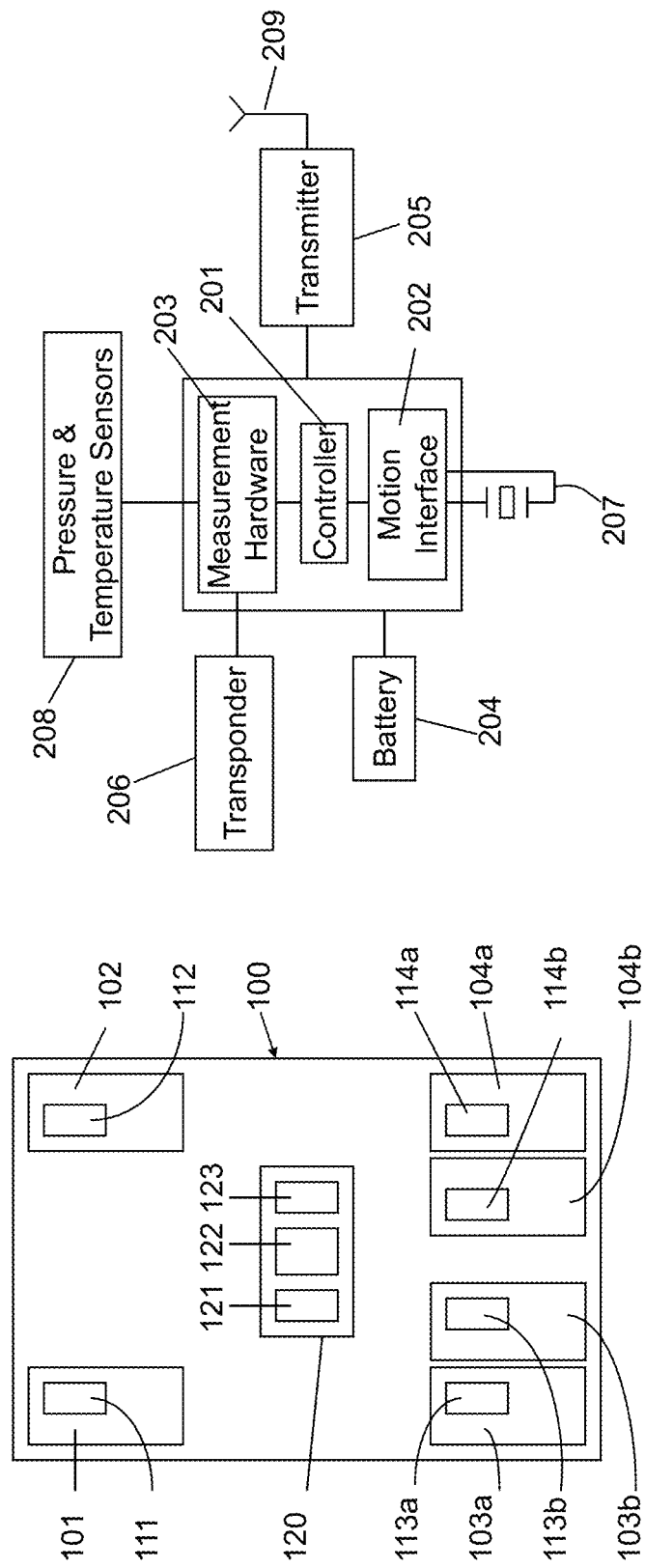

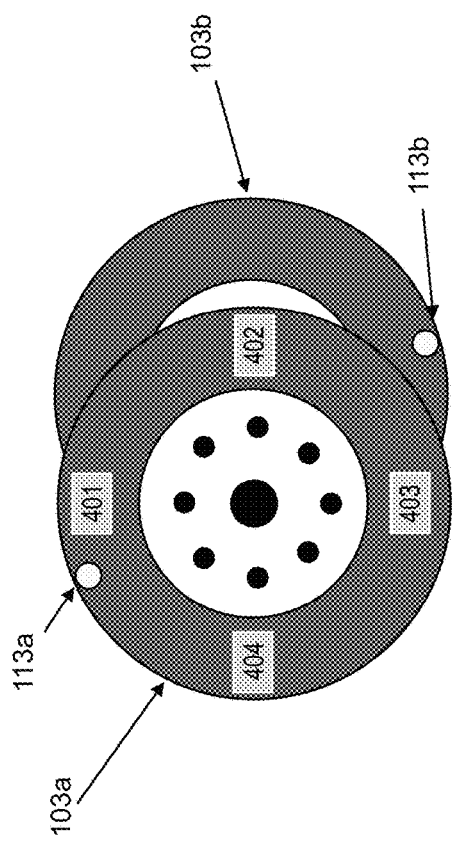
| Activation Point | Sensor ID 113a Received LF Field Strength | Sensor ID 113b Received LF Field Strength |
|---|---|---|
| 401 | 90 | 0 |
| 402 | 30 | 50 |
| 403 | 0 | 70 |
| 404 | 60 | 20 |
Fig. 7B
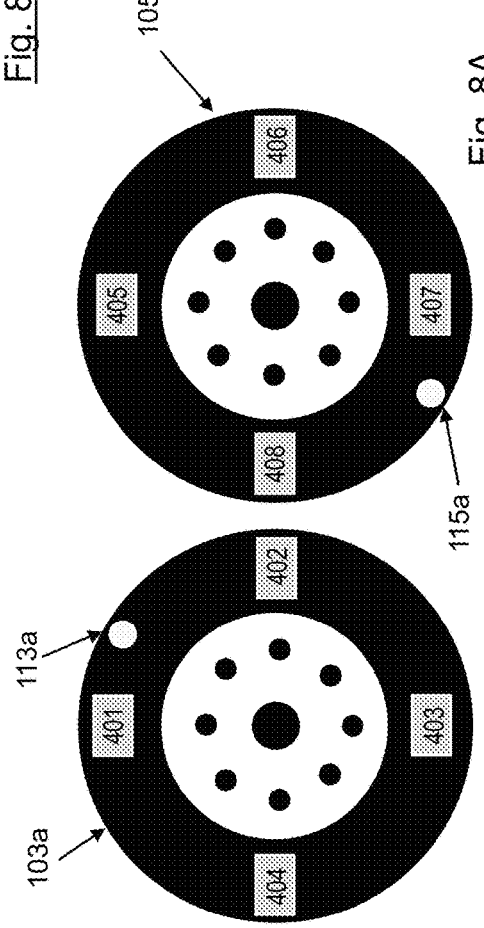
| Activation Point | 113a LF Field Strength | 115a LF Field Strength |
|---|---|---|
| 401 | 90 | 0 |
| 402 | 60 | 40 |
| 403 | 0 | 20 |
| 404 | 20 | 0 |
| 405 | 20 | 0 |
| 406 | 0 | 30 |
| 407 | 0 | 90 |
| 408 | 40 | 60 |
Fig. 8B
Fig. 8A

TIRE SENSOR LOCATION METHOD AND APPARATUS

CROSS REFERENCES

The present application for patent claims priority to United Kingdom Patent Application No. 1717964.9 to Stewart, et. al., titled "TIRE SENSOR LOCATION METHOD AND APPARATUS", filed Oct. 31, 2017, assigned to the assignee hereof, which is hereby incorporated by reference in its entirety.

FIELD OF THE INVENTION

The present invention relates to tire monitoring sensors.

BACKGROUND TO THE INVENTION

Tire Pressure Monitoring Systems (TPMS) typically include a tire sensor mounted on each wheel of a vehicle. The sensor may be mounted on the stem of the tire valve, or on a belt around the rim, or on an internal surface of the tire, e.g. on the inner liner of the tire. The location of valve mounted tire sensors is fixed, but the location of tire or rim mounted sensors is not.

In use the tire sensor transmits dynamic parameters such as tire pressure, temperature and/or contact patch (or "footprint") length to a controller located elsewhere on the vehicle. The tire sensor may also communicate wirelessly with external devices in order to be activated, programmed and/or interrogated in relation to information such as installation date, Department of Transport (DOT) code, speed rating, load rating or any other relevant tire characteristics.

It is important to know the location of the tire sensor with respect to the tire in order for it to be correctly activated, programmed and/or interrogated by external devices such as diagnostic tools. Not knowing the sensor location can be frustrating and may lead to the interrogation or configuration of the wrong sensor, which can result in system failure. This problem is exacerbated in the case of dual tires, where the location of the TPMS sensor of each tire needs to be determined. In particular, if the TPMS sensors of both tires are close enough to each other that they are simultaneously in range of the tool, then means for distinguishing one from the other is required.

It is known to place tire mounted sensors in a designated location with respect to a reference point on the external surface of the tire, for example in line with the letter "D" of the DOT code, but this is not reliable since the reference point may become obscured or erased, or the sensor may be located incorrectly through human error. Also, in cases where wheels are provided in sets of two, it may not be possible for a user to see the reference point. For rim mounted, or banded, sensors, loosening of the band through general use often results in the sensor moving from its original mounting location on the nm.

It would be desirable to mitigate the problems outlined above.

SUMMARY OF THE INVENTION

A first aspect of the invention provides a method of locating at least one wheel-mounted electronic device on a wheeled vehicle, the method comprising:

transmitting from an interrogation device a wireless signal from each of a plurality of interrogation locations;

receiving, at said at least one wheel-mounted device and in respect of each interrogation location, the respective wireless signal;

measuring, at said at least one wheel-mounted device and in respect of each interrogation location, a strength of the respective received wireless signal;

transmitting, from said at least one wheel-mounted device and in respect of each interrogation location, a wireless signal indicating the measured signal strength;

receiving, at said interrogation device said signals indicating measured signal strength;

determining from the received signals indicating measured signal strength a location of said at least one wheel-mounted device with respect to a respective wheel.

Preferably said transmitting from said interrogation device comprises transmitting said wireless signal using a first wireless transmitter, for example comprising a coil antenna. The first wireless transmitter preferably comprises a low frequency (LF) wireless transmitter. Receiving the wireless signal at said at least one wheel-mounted device preferably comprises receiving the wireless signal using a first wireless receiver, preferably comprising a low frequency (LF) receiver. The first wireless receiver may comprise a coil antenna, the coil antenna conveniently being part of a transponder.

In preferred embodiments transmitting the wireless signal indicating the measured signal strength comprises transmitting said wireless signal using a second wireless transmitter. Receiving said signals indicating measured signal strength may comprise receiving the wireless signals using a second wireless receiver. The second wireless transmitter and/or said second wireless receiver may be configured to transmit and receive, respectively, in a high frequency (HF) range, or at a higher frequency, for example in the ultra high frequency (UHF) range.

In preferred embodiments said measuring comprises measuring the amplitude or RSSI (received signal strength indicator) of the respective received wireless signal.

The preferred method includes, for each interrogation location, moving said interrogation device to the interrogation location, transmitting said wireless signal from the interrogation device at the interrogation location, and receiving the respective measured strength indicating signal at the interrogation location.

Said determining preferably involves determining, for the or each wheel-mounted device, a respective signal strength for each of a plurality of said interrogation locations and determining said location of the respective wheel-mounted device depending on the respective signal strengths.

Said determining said location of the respective wheel-mounted device may involve analysis of the respective signal strengths and the respective interrogation locations, for example using a geometric analysis and/or a statistical confidence analysis.

In preferred embodiments determining said location of the respective wheel-mounted device involves selecting a respective one of said interrogation locations as said location for the respective wheel-mounted device.

In some embodiments the method includes determining for each of a first and a second wheel-mounted device, respective signal strength data for each of a plurality of said interrogation locations, and determining if said first and second wheel-mounted device is installed in an inner wheel or an outer wheel depending on the respective signal strength data.

In some embodiments the method includes determining for each of a first and a second wheel-mounted device, a respective signal strength for each of a plurality of said interrogation locations, and determining if said first and second wheel-mounted device is installed in a relatively forward wheel or a relatively rearward wheel depending on the respective signal strengths.

In typical embodiments said at least one wheel-mounted device is a tire monitoring device, preferably a tire pressure monitoring device.

Optionally said interrogation device includes at least one motion detecting device, the method including determining the location of said interrogation device using said at least one motion detecting device and transmitting said wireless signal upon determining that said interrogation device is in any one of said interrogation locations.

The preferred method includes delaying transmitting said measured signal strength signal from the respective wheel-mounted device by a delay period from a reference time. The length of said delay period may depend on the respective measured signal strength.

Typically, said transmitting said wireless signal indicating the measured received signal strength from said at least one wheel-mounted device in respect of each interrogation location includes transmitting an identifier for the respective wheel-mounted device.

A second aspect of the invention provides a method of communicating wirelessly with a plurality of electronic devices, the method comprising:
transmitting from a first electronic device a wireless signal to a plurality of other electronic devices;
receiving, at said other electronic devices, the wireless signal;
measuring, at said other electronic devices, a strength of the respective received wireless signal;
transmitting, from said other electronic devices, a response signal, wherein the method further includes delaying transmitting said response signal from the respective other electronic device by a delay period from a reference time, and wherein the length of said delay period depends on the respective measured signal strength.

A third aspect of the invention provides a system for locating at least one wheel-mounted electronic device on a wheeled vehicle, the system comprising:
an interrogation device configured to transmit a wireless signal from each of a plurality of interrogation locations; and
at least one wheel-mounted device configured to receive, in respect of each interrogation location, the respective wireless signal,
wherein said at least one wheel-mounted device is configured to measure, in respect of each interrogation location, a strength of the respective received wireless signal, and to transmit, in respect of each interrogation location, a wireless signal indicating the measured signal strength,
and wherein said interrogation device is configured to receive said signals indicating measured signal strength and to determine from the received signals indicating measured signal strength a location of said at least one wheel-mounted device with respect to a respective wheel.

A fourth aspect of the invention provides an interrogation device for locating at least one wheel-mounted electronic device on a wheeled vehicle, the interrogation device being configured to transmit a wireless signal from each of a plurality of interrogation locations, and to receive from said at least one wheel-mounted electronic device a signal indicating measured signal strength, and to determine from the received signals indicating measured signal strength a location of said at least one wheel-mounted device with respect to a respective wheel.

A fifth aspect of the invention provides a wheel-mountable device for a wheeled vehicle, the device being configured to receive a respective wireless signal from each of a plurality of interrogation locations, and to measure, in respect of each interrogation location, a strength of the respective received wireless signal, and to transmit, in respect of each interrogation location, a wireless signal indicating the measured signal strength.

A sixth aspect of the invention provides a wireless communication system comprising: a first electronic device configured to transmit a wireless signal to a plurality of other electronic devices, wherein each of said other electronic devices is configured to receive the wireless signal, to measure a strength of the respective received wireless signal and to transmit a response signal, wherein each of said other electronic devices is configured to delay transmitting said response signal by a delay period from a reference time, and wherein the length of said delay period depends on the respective measured signal strength.

From another aspect the invention provides a tire monitoring device for mounting on an internal surface of a tire, the device comprising wireless communication means and being operable in a locating mode in which it is configured to transmit a signal indicating the respective strength of a signal received by said wireless communications means. The wireless communication means preferably comprises a coil antenna, preferably a multi-turn coil antenna. The coil antenna is preferably configured to operate in the low frequency (LF) signal range. Conveniently a transponder coil may be used, and to this end the wireless communication means may comprise a transponder, preferably an LF transponder. In the locating mode, the transmitted signal may indicate the strength of the signal received by the transponder, which typically corresponds to the strength of the signal induced in said at least one transponder coil. The wireless communication means may comprise a wireless transmitter, for example an RF transmitter, for transmitting said strength-indicating signal. Hence in preferred embodiments the wireless communications means comprises first (e.g. the transponder) and second (e.g. the RF transmitter) wireless communications devices, one of which, in the locating mode, receives a signal and the other of which transmits a corresponding strength-indicating signal. In alternative embodiments, the same wireless device may be used for both said receiving and said transmitting, in which case only a single wireless transceiver need be provided.

In typical embodiments, the tire monitoring device comprises a pressure sensor, RF transmitter, a central controller including a memory, a power source and a LF transceiver or LF receiver (e.g. a transponder), and may also comprise a temperature sensor and/or one or more motion sensors.

More generally the invention may be used in respect of any electronic device that is mounted, in use, on a wheel (including the rim or the tire) and which supports wireless communication with another device that is not mounted on the wheel. Accordingly the invention is applicable not only to TPMS devices or other tire monitoring devices, but also to, for example, RFID tags.

It will be understood that the term "wheel" used herein is intended to include the rim and the tire mounted on the rim.

Further advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which:

FIG. 1 is a schematic view of a wheeled vehicle with a Tire Pressure Monitoring System (TPMS) in which each wheel has a TPMS sensor mounted within the tire cavity;

FIG. 2 is a schematic representation of a typical TPMS sensor;

FIG. 7A shows a pair of dual wheels with suitable activation points indicated;

FIG. 7B shows a table indicating exemplary field strengths for each activation point of FIG. 7A;

FIG. 8A shows two in-line wheels with suitable activation points indicated;

FIG. 8B shows a table indicating exemplary field strengths for each activation point of FIG. 8A.

DETAILED DESCRIPTION OF THE DRAWINGS

Figure 3:
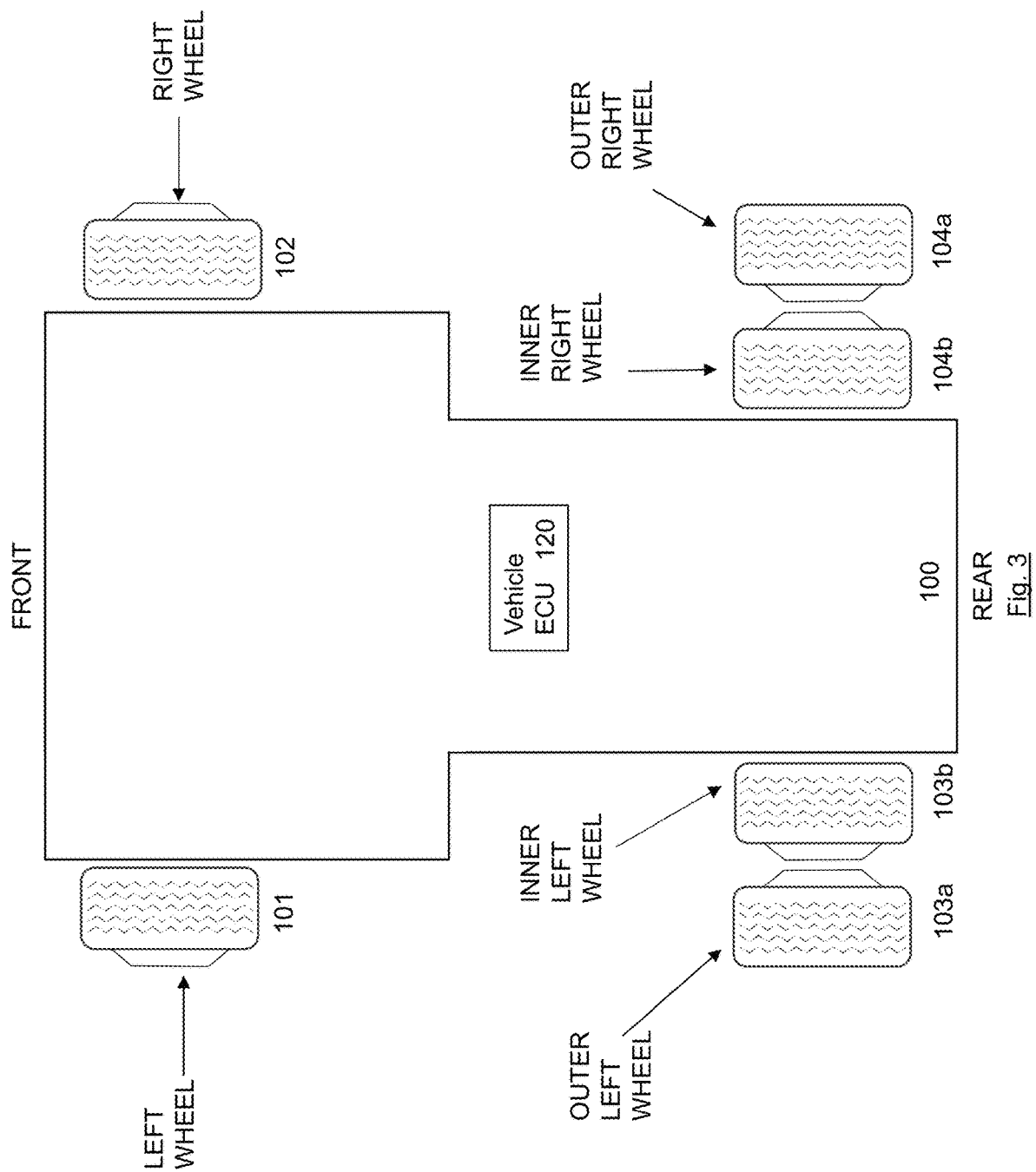
FIG. 3 is a schematic plan view of a vehicle with dual rear wheels.

FIG. 1 shows a system diagram of a wheeled vehicle 100, each wheel including a tire mounted on a rim. The arrangement and number of wheels can vary depending on the vehicle. In this example 6 wheels are shown 101, 102, 103a, 103b, 104a and 104b. Each wheel is fitted with a tire monitoring device, which in preferred embodiments is a tire pressure monitoring device, also known as a TPMS sensor or TPMS device, 111, 112, 113a, 113b, 114a and 114b, being a wheel mountable component of a tire pressure monitoring system (TPMS). In preferred embodiments, the TPMS device is of a type that is intended for mounting on an internal surface of the tire, especially in the tread region but optionally on a side wall, rather than a type that is mounted on the rim of the respective wheel or on the valve stem.

The vehicle 100 includes a control unit, for example electronic control unit (ECU) 120, which is configured to receive and process transmissions from the TPMS devices 111, 112, 113a, 113b, 114a and 114b and as such forms part of the TPMS. The ECU 120 typically comprises at least a TPMS receiver 121, a controller 122, and a means of communicating with other vehicle electronics 123, such as a CAN or LIN bus. The TPMS receiver 121 receives signals, typically wirelessly, from the TPMS devices 111, 112, 113a, 113b, 114a and 114b and the controller 122 is configured to process the signals to perform tire pressure monitoring, the nature of which may vary from system to system.

FIG. 2 shows a block diagram of an embodiment of the TPMS device 111, 112, 113a, 113b, 114a, 114b. The TPMS device includes a controller 201, which may comprise a suitably programmed processor, for example a dedicated microprocessor or a microcontroller, or other programmable processing device. Standard components such as a RAM memory, an ADC, an I/O interface, a clock oscillator and a central microprocessor (not shown) may be provided, the components typically being integrated onto a single chip. Alternatively, a custom microcontroller, for example an Application Specific Integrated Circuit (ASIC), designed specifically for the TPMS application may be used and may integrate ancillary components such as a temperature sensor.

The TPMS device is typically powered by a battery 204 although other micro power sources may be used, e.g. thermoelectric and/or piezoelectric generators and/or electromagnetic induction device, instead of or in addition to the battery.

The TPMS device includes a first wireless communications device, typically comprising a transponder 206. The transponder 206 may be provided to receive command signals from and/or to transmit signals to a separate device (not shown in FIG. 2) for the purposes of programming and/or interrogating the TPMS device. The transponder 206 is typically configured to support low frequency (LF) wireless communication, for example at 125 kHz, or other frequency in the low frequency (LF) range (30 kHz to 300 kHz). Advantageously, the transponder 206 provides relatively low power transmission, and LF signals are particularly suited to short range communication and limit the degree of crosstalk from devices further away.

A motion detector 207, for example comprising one or more shock sensors, accelerometer or roll switch, is typically provided and may interface with the controller 201 using any suitable conventional interface hardware 202.

A pressure sensor 208, e.g. a piezo resistive transducer or a piezoelectric or capacitance based pressure sensor, is provided for measuring the fluid (typically air or other gas) pressure in the respective tire. The pressure sensor 208 is connected to measurement apparatus 203 for measuring the pressure using signals received from the pressure sensor 208 and for providing corresponding measurement information to the controller 201. During routine pressure measurement, under control of the controller 201 the measurement apparatus 203 samples the output of the pressure sensor 208 at intervals and communicates corresponding measurement data to the controller 201. Typically, the measurement apparatus 203 comprises hardware, i.e. electronic circuitry, for performing its measurement tasks, the configuration of which may vary but typically includes at least one amplifier, may include at least one filter and, for the purposes of routine pressure measurement at least, may include an analogue to digital converter (ADC) (not shown) for measuring pressure values. The measurement apparatus 203 may therefore be described as means for controlling the measuring of pressure. One or more temperature sensor may be similarly provided.

A second wireless communication device typically comprising a transmitter 205 with antenna 209 is used to make transmissions to the vehicle ECU 120. The transmitter 205 is typically an RF transmitter for transmitting in the high frequency (HF) band or higher. For example the transmitter may comprise a UHF transmitter, e.g. transmitting at 315 or 433 MHz. It will be understood that the transmitter 205 may optionally be provided as part of a transceiver.

In typical embodiments, the TPMS device 111, 112, 113a, 113b, 114a, 114b may be generally similar to known TPMS devices and may share many features with those devices already well known to those skilled in the art. The fundamentals of the TPMS system may remain the same—a self-powered TPMS device attached in use to a vehicle wheel, in a manner that allows it to measure the pressure and optionally the temperature of the gas in the tire. Pressure measurements are usually taken periodically. In use the TPMS device transmits data representing the measured parameters to an external controller such as the vehicle ECU 120. A temperature sensor may also be provided.

FIG. 3 shows a schematic plan view of an alternative wheeled vehicle 100 on which the tire pressure monitoring system may be installed. The vehicle 100, which may for example be a truck or van, has at least one set of dual wheels (rear wheels 103*a*, 103*b* and 104*a*, 104*b*) in the present example). The vehicle 100' has a central ECU 120 which is able to receive and decode transmissions from the TPMS devices (not shown) provided in wheels 101, 102,103*a*, 103*b*, 104*a* and 104*b*. The dual wheel configuration comprises a set (or pair) of wheels mounted together (i.e. side by side and coaxially) but in opposite orientations. For example wheel 103*a* is mounted facing wheel 103*b*. This means a TPMS device installed correctly in wheel 103*a* should detected rotation in an opposite sense to the rotation detected by a TPMS device mounted correctly in wheel 103*b*. This is important for auto location routines which rely upon knowing the orientation of a TPMS device. More generally, the vehicle may comprise one or more sets of single wheels and/or one or more sets of dual wheels, the wheels being provided on a tractor unit or a trailer unit as applicable.

Figure 4:
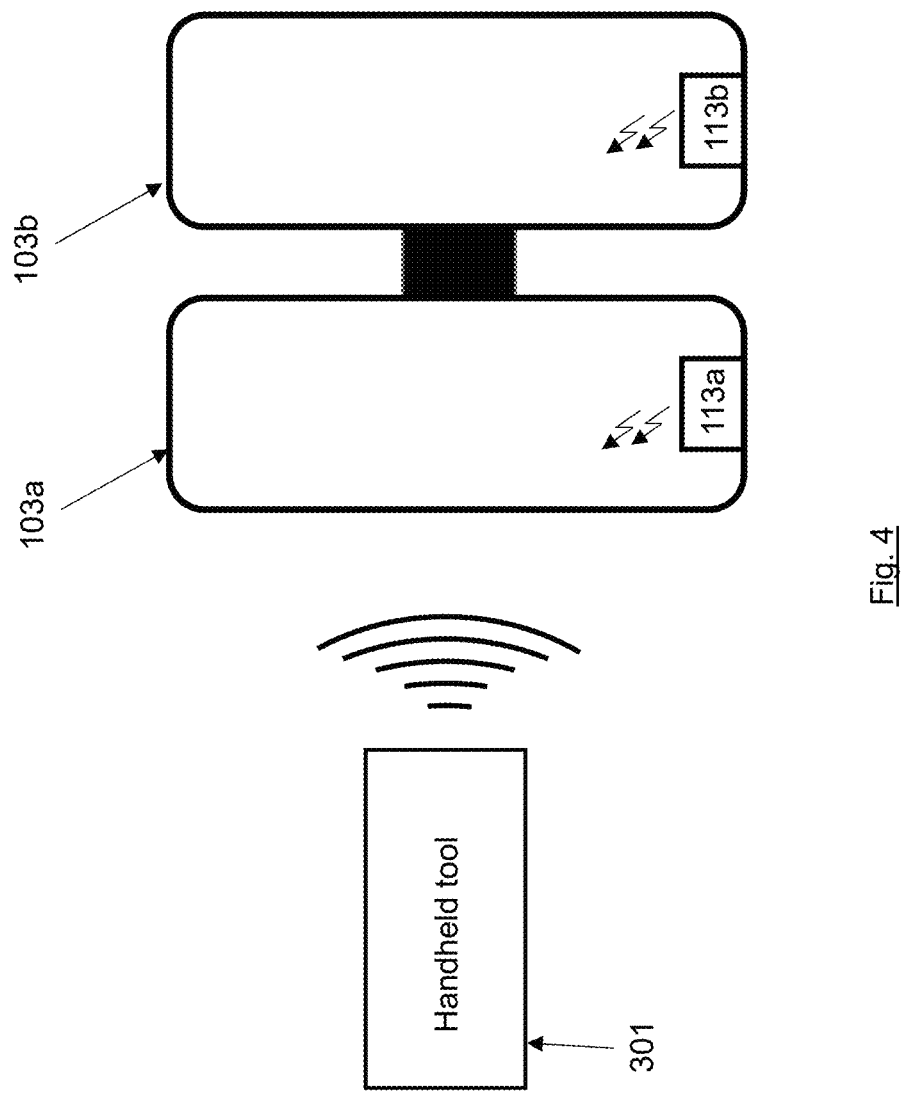
FIG. 4 is a schematic view of a pair of dual wheels and an interrogation device.

FIG. 4 shows, for the purpose of illustration, one set of dual wheels 103*a*, 103*b*. A respective TPMS device 113*a*, 113*b* is provided on each wheel 103*a*, 103*b*. In particular, each TPMS device 113*a*, 113*b*, is mounted on an internal surface of the respective tire of the respective wheel 103*a*, 103*b*. The TPMS device may be mounted directly on the tire surface or indirectly, e.g. via a mount (not shown), as is convenient. In any event the TPMS device may be located at any circumferential location around the wheel. While the following description is provided in the context of the TPMS devices 113*a*, 113*b*, it will be understood that the same or similar description applies, as would be apparent to a skilled person, to any one or more of the other TPMS devices that are part of the TPMS, whether installed on a tire of a dual wheel set 103*a*, 103*b* and 104*a*, 104*b* or of a single wheel 101, 102.

FIG. 4 also shows an electronic device 301 that is capable of communicating wirelessly with each TPMS device located within a wheel. The device 301 is typically a maintenance tool that is operable to program and/or interrogate the TPMS devices as required, and may be referred to as a programming tool and/or a diagnostics tool depending on its functionality. The device 301 can take any convenient conventional form so long as it can communicate wirelessly with the TPMS devices. Typically the device 301 is portable, conveniently being provided as a hand-held unit. As is described in more detail hereinafter, the device 301 is used in a locating mode to determine the circumferential location of the, or each, wheel-mounted TPMS device. As such it may be referred to as an interrogation device.

Figure 5:
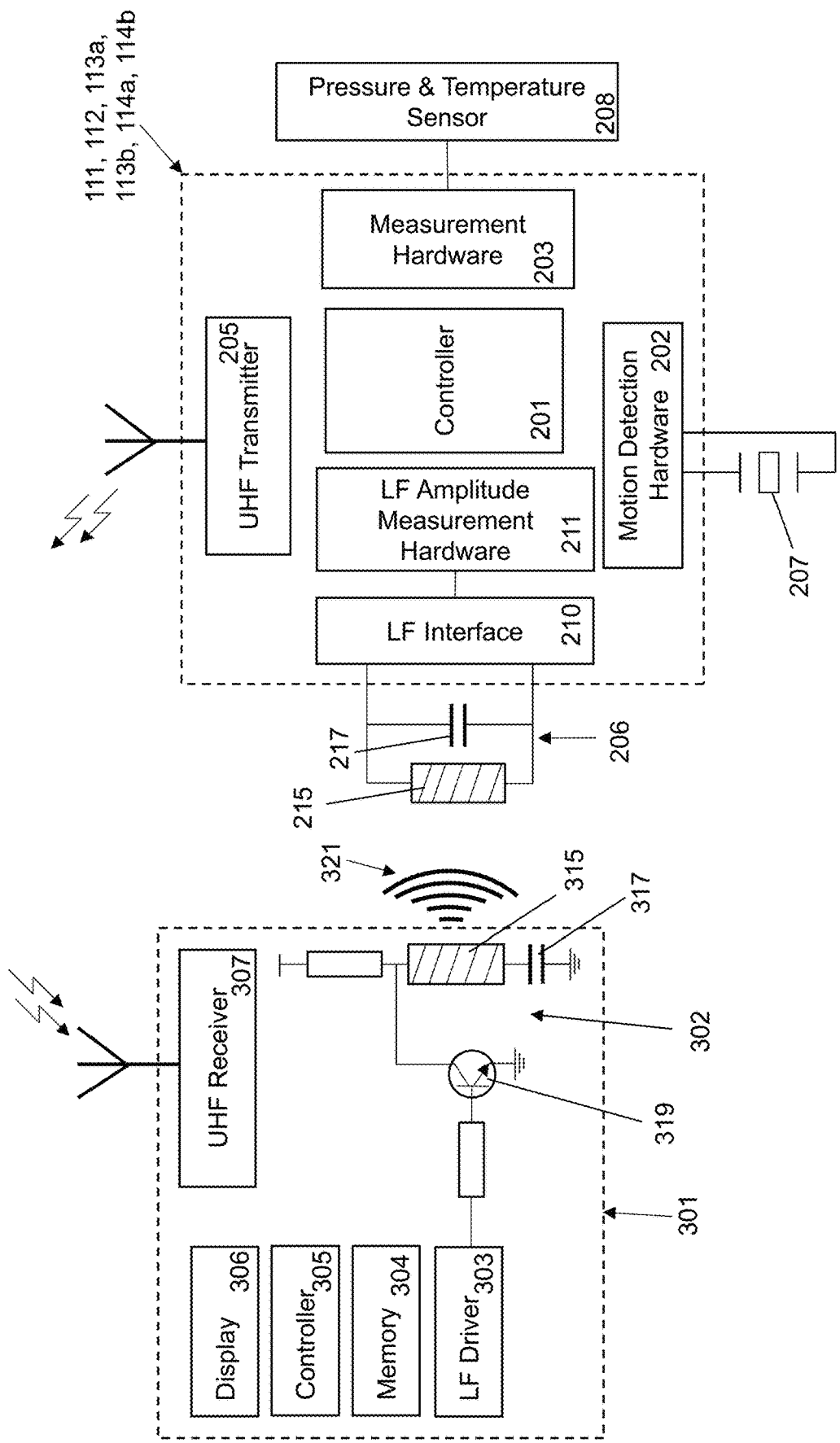
FIG. 5 shows a block diagram of one embodiment of a system including the interrogation device and the TPMS sensor.

FIG. 5 shows a block diagram of typical components of an embodiment of a system comprising any one of the TPMS devices 111, 112, 113*a*, 113*b*, 114*a*, 114*b* and the interrogation device 301. In FIG. 5, where relevant the same numerals are used as for FIG. 2 to denote the same or similar parts, and the same or a similar description applies as would be apparent to a skilled person.

The TPMS device includes the controller 201, which may for example comprise a microcontroller or a custom Application Specific Integrated Circuit (ASIC), and typically includes standard components such as a microprocessor, a memory, Input/output interface and a clock oscillator (not shown). The measurement hardware 203 is used to measure pressure and/or temperature from the pressure sensor 208 or temperature sensor (not shown) as applicable. The measurement hardware 203 typically comprises a filter, an amplifier and an analogue to digital converter (not shown). The motion detection hardware 202 is used to detect motion. It typically comprises one or more accelerometer or shock sensor 207 to monitor acceleration forces. It will be understood that while these components may be present in a typical embodiment of a TPMS device, they are not all essential for performing the present invention.

In preferred embodiments, TPMS device and interrogation device 301 include co-operable first wireless communication devices 206, 302 each comprising a respective antenna coil 215, 315 that support a wireless link, preferably an LF wireless link between the TPMS device and interrogation device 301, for example at an LF operating frequency of 125 KHz. In typical embodiments, the first wireless link supports a communication channel between the TPMS device and interrogation device 301, which may for example be used to program and/or interrogate the TPMS device as required. The LF link is particularly suited for use in short range interactions between the interrogation device 301 and the TPMS device, which helps to reduce instances of crosstalk with other more distant TPMS devices.

In the illustrated embodiment the antenna coil 215 (which may be referred to as the secondary coil) is included in a transponder circuit that includes a tuning capacitor 217 in parallel with the coil 215. In this embodiment, the device 206 comprises a transponder. The transponder 206 comprises, or is connected to an LF interface 210 and facilitates receiving (and optionally sending) signals via the coil 215. The LF interface 210 may comprise any convenient conventional electrical/electronic circuitry for this purpose. The LF interface 210 also couples the LF coil 215 to measurement apparatus 211 for measuring the strength of signals received by the coil 215. Conveniently this may be achieved by measuring the amplitude or RSSI (received signal strength indicator) of received signals that are provided from the coil 215 to measurement apparatus 211 via the interface 210. The measurement apparatus 211 may comprise any convenient electrical/electronic circuitry for measuring signal strength. Typically, received signal strength is measured. Operation of the transponder 206 and measurement apparatus 211 is performed by the controller 201.

The RF transmitter 205 is used to send relatively high frequency communications primarily to the vehicle ECU 120, for example at a frequency of 315 or 433 MHz. In normal use, e.g. when the vehicle is travelling and the TPMS device is monitoring tire pressure, these communications may comprise data stored in the TPMS device's memory and/or data measurements taken by the TPMS device.

The interrogation device 301 includes a controller 305 which may comprise a suitably programmed processor, for example a dedicated microprocessor or a microcontroller, or other programmable processing device. Standard components such as a RAM memory, an ADC, an I/O interface and a clock oscillator are provided as required. A data storage memory 304 is typically also provided. A visual display unit 306 may be provided as part of a user interface to allow a user to use the interrogation device 301. The wireless communication device 302 comprises antenna coil 315 (which in this embodiment may be referred to as the primary coil) included in a transmitter circuit which, in the illustrated example includes capacitor 317 and transistor 319. The interrogation device 301 includes a driver 303 for operating the transmitter circuit under control of the controller 305, including applying RF signals (LF signals in this example) to the coil 315.

The interrogation device 301 also includes a second wireless communication device typically comprising a receiver 307 with antenna. The receiver 307 is typically an RF receiver, preferably a UHF receiver, e.g. receiving at 315 or 433 MHz, or other receiver for receiving in the HF band or above. It will be understood that the receiver 307 may optionally be provided as part of a transceiver. The receiver 307 together with the transmitter 205 of the TPMS device supports a second wireless link between the interrogation device 301 and the TPMS device, the second link providing a communication channel between the interrogation device 301 and the TPMS device. In preferred embodiments the first wireless link is an LF wireless link and the second wireless link is a UHF wireless link, or other higher frequency link (preferably HF or higher). In the illustrated embodiment, the LF link supports the transmission of data from the interrogation device 301 to the TPMS device (and optionally from the TPMS device to the interrogation device 301), in particular to support programming and/or diagnostic modes of operation as required. However, for the locating mode of operation described hereinafter the LF link is not required to transmit data but instead only to support electromagnetic coupling between the respective coils 315, 215. Hence in embodiments where the interrogation device 301 is not required to perform any programming or diagnostics, there is no need for the interrogation device 301 to be configured to support an LF data channel.

When the interrogation device 301 is sending data to the TPMS device, e.g. in a programming mode, the controller 305 can modulate data onto the coil 315 by on-off keying using the transistor 319. This modulation of the coil 315 is detected by the coil 215 of the TPMS device as an energy loading modulation of the LF field linking the coils 215, 315, which in turn causes changes in the voltage across the coil 215. The LF interface 210 of the TPMS device is able to detect these voltage changes and recover the data.

By way of example, in the programming mode, the interrogation device 301 can provide the TPMS device with data indicating any one or more of the relative position on the vehicle of the TPMS device, orientation of the TPMS device, if the TPMS device is part of a dual wheel set or not and, if so, if the TPMS device is mounted in the inner or outer wheel.

The interrogation device 301 may operate the transistor 319 to energise the coil 315 in other modes of operation, including the locating mode described hereinafter. More generally, when the coil 315 of the interrogation device 301 is energised (in this case by the driver 303 under control of the controller 305) it produces an electromagnetic (EM) field 321. When the interrogation device 301 is within range of any one or more of the TPMS devices, the field 321 induces a resonant AC voltage in the coil 215 of the TPMS device by electromagnetic coupling. The LF interface 210 produces corresponding signals to the measurement apparatus 211 and/or to the controller 201 for analysis.

More generally, it is desirable that the first wireless communication link between the interrogation device 301 and the TPMS device is supported by antenna coils 315, 215 which, in use, couple magnetically by electromagnetic induction. The coils 315, 215 are preferably multi-turn coils. Conveniently, therefore, the antenna coils 315, 215 may each comprise a transponder coil (and may be referred to respectively as the primary coil and the secondary coil). Advantageously, the coupling between the coils 315, 215 (which may comprise near-field magnetic coupling) is affected appreciably by relatively small changes in distance between the coils 315, 215 with the result that for a given transmit signal strength, the received signal strength changes significantly (i.e. by amounts that are readily detectable) depending on the distance between the coils 315, 215. In particular, the RSSI has a cubic rate of decay with increased distance between the coils 315, 215. As a result, for a given strength of signal transmitted from the interrogation device 301 at a given location, the strength of the corresponding signal received by a TPMS device varies depending on the distance between the TPMS device and the interrogation device 301 to an extent that is readily detectable. This facilitates comparison of received signal strengths from different TPMS devices in the locating mode. Configuring the respective devices such that the first wireless communication link is an LF link is preferred, but not essential, as it facilitates differentiation between received signal strengths.

Although preferred embodiments support first and second wireless communication links between the interrogation device 301 and the TPMS devices (the first for measuring received signal strength and the second for transmitting signal strength data), it will be understood that this is not essential. For example, the first communication link may be used for both measuring received signal strength and for transmitting signal strength data from the respective TPMS device to the interrogation device 301, in which case the second wireless link (and supporting components) is not required, at least for implementing the locating mode described herein. It is preferred to use the second wireless link for transmitting the signal strength to the interrogation device because the higher frequency link is better suited to transmitting data, and also because, for a typical TPMS device, the components for supporting the higher frequency link are already provided. By way of example, in embodiments where the signal strength data is transmitted to the interrogation device 301 by the transponder 206, the LF interface 210, under control of the controller 201, causes the coil 215 to transmit a signal carrying the signal strength data (and the respective device ID). This may involve modulating the coil 215 with data indicative of the measured RSSI at the secondary coil 215, which loads the primary coil 315 and the corresponding data can be detected from the primary coil 315 by an LF detection circuit (not shown in FIG. 5). This is a form of RFID technology. In such embodiments, the transponder 206 operates as a transmitter and the circuit 302 operates as a receiver. More generally, the TPMS device transmits a wireless signal to the interrogation device 301, the wireless signal carrying data indicating the strength of the signal that the TPMS device received from the interrogation device 301. The signal transmitted by the TPMS device may be modulated with the signal strength data in any conventional manner. The signal strength data advantageously comprises a value representing the measured analogue signal strength.

Figure 6:
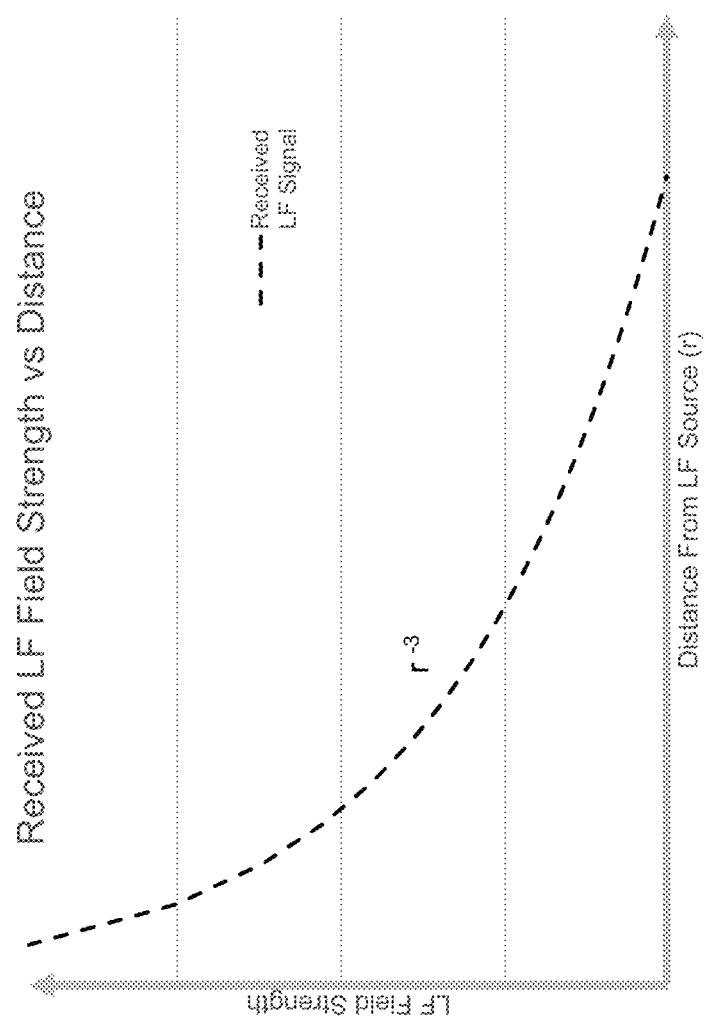
FIG. 6 shows a graph illustrating field strength versus distance.

FIG. 6 shows a graph illustrating how the EM field strength (which in the present example is an LF field) varies depending on the distance between the interrogation device 301 and the TPMS device 111, 112, 113a, 113b, 114a, 114b. In particular, the field strength decreases with increased distance and vice versa. Therefore, the strength of the EM field detected by the TPMS device is an indication of how far apart the TPMS device is from the interrogation device 301. The strength of the field detected by the TPMS device can be determined by measuring the amplitude or RSSI of the output signal produced by the transponder 206. Conveniently, this may be achieved by measuring the amplitude or RSSI of the voltage across and/or current through the coil 215. In any case, measurement of the detected field strength is performed by the measurement apparatus 211. The TPMS device may then transmit data indicative of the measured field strength to the interrogation device 301. The interrogation device 301 uses the field strength data as an indication of how far away the TPMS device is from the tool. By obtaining multiple instances of the field strength data from the TPMS device, each instance corresponding to a respective different position of the interrogation device 301 relative to the TPMS device, the interrogation device 301 is able to determine the circumferential location of the TPMS device with respect to its tire/wheel. Preferably, in each transmission of field strength data, an identifier (ID) for the respective TPMS device is provided to allow the interrogation device 301 to determine which TPMS device transmitted the data. The field strength data may be transmitted by any wireless link supported between the interrogation device 301 and the TPMS device. In preferred embodiments, the field strength data is sent via the transmitter 205 and receiver 307.

In preferred embodiments, the TPMS device 111, 112, 113a, 113b, 114a, 114b is configured to send the current field strength data to the interrogation device 301 in response to receiving an activation signal from the interrogation device 301. The activation signal may be transmitted by any wireless link supported between the interrogation device 301 and the TPMS device. In preferred embodiments, the activation signal is sent via the first wireless link supported by the antennas 315, 215 and associated transmitter 302 and receiver 206. In preferred embodiments, therefore the TPMS device receives the activation signal via the LF link and responds by transmitting the field strength data via the UHF link.

In preferred embodiments, the interrogation device 301 sends an activation signal to the TPMS device from each of a plurality of (preferably at least three) different interrogation locations, and receives corresponding signal strength data from the (or each) TPMS device for each location. Preferably, the interrogation locations lie substantially in a plane that is perpendicular to the rotational axis of the wheel in which the TPMS is installed. The interrogation device 301 determines a location, in particular a circumferential location, of the respective TPMS device with respect to its tire/wheel using the respective signal strength data for each interrogation location. This may be performed using any convenient technique, for example a geometric technique such as trilateration, triangulation, quadrilateration, quadrilangulation, or a confidence based technique (e.g. involving any convenient statistical confidence analysis technique). Conveniently the interrogation locations are spaced apart around a notional circle, e.g. corresponding to the circumference of the tire/wheel in which the TPMS device is installed. It is noted that the determined TPMS device location need not be precise. For example, the determined TPMS device location may indicate which segment, e.g. quadrant, of the tire the TPMS device is located in.

In use, a user (not shown) moves the interrogation device 301 to each interrogation location in turn and operates the activation device to transmit the activation signal from each location. Advantageously, the method is performed using a single interrogation device 301. In preferred embodiments, each interrogation location is pre-determined (e.g. defined with respect to the wheel/tire in which the respective TPMS device is installed) and known to the interrogation device 301. Conveniently the user moves the interrogation device 301 to each interrogation location in accordance with a pre-determined sequence. In alternative embodiments, the interrogation locations and/or the sequence need not be pre-determined. However, this complicates the operation of the interrogation device 301 for the user since the user would be required to input to the device 301 additional information relating to the interrogation locations and/or the sequence as applicable.

An example of the operation of the interrogation device 301 and the TPMS 111, 112, 113a, 113b, 114a, 114b in the locating mode is now described with reference to FIGS. 7A and 7B. FIG. 7A shows a set of dual wheels 103a, 103b, each having a respective TPMS device 113a, 113b. A plurality of interrogation locations 401, 402, 403, 404 are defined with respect to the (outer) wheel 103a. Assuming that the wheels 103a, 103b are static, the interrogation device 301 is moved to each interrogation location 401, 402, 403, 404 in turn. In each interrogation location, the interrogation device 301 transmits the activation signal. In this example, the activation signal is received by each of the TPMS devices 113a, 113b and so each TPMS device 113a, 113b transmits signal strength data to the interrogation device 301 by way of response together with its device ID. Conveniently, the interrogation device 301 determines which responses emanated from which TPMS device 113a, 113b using the respective device ID included in the responses.

It is noted that, in preferred embodiments, the activation signal is transmitted via the transmitter 302 and so the signal strength measured by the TPMS device may be the strength of the activation signal itself as received at the TPMS device, which may conveniently be measured as RSSI signal strength. Alternatively, or in addition, the interrogation device 301 may concurrently be transmitting data to the TPMS device (e.g. to program the TPMS device) via the transmitter/receiver 302, 206 in which case the strength of the field detected by the transponder 206 may be measured.

In preferred embodiments, each TPMS device is configured to delay transmitting its signal strength data and device ID for a respective different time period (which may for example be measured from the time of receipt of the activation signal or any other convenient reference time). To this end, each TPMS device may be programmed with its own delay time period. In preferred embodiments, the respective delay time period implemented by each TPMS device is determined by a characteristic of the received activation signal at the respective TPMS device, conveniently the strength of the received activation signal. For example, the received RSSI signal strength may be used for this purpose. Therefore, since the received signal strength at each TPMS device is different (because they are located at different distances from the interrogation device 301), the transmission delay effected by each TPMS device is different. This reduces the chance that the respective transmissions from different TPMS devices will interfere with one another in cases where more than one TPMS device is within range of the interrogation device 301. For example, the arrangement may be such that the delay between the respective transmission from successive TPMS devices is at least as long as the length of the transmission. It will be understood that the method of delaying transmission based on measured signal strength is not limited to use with TPMS device locating methods and may alternatively be used in any system where electronic devices are required to communicate with one another, especially where the devices communicate wirelessly using low frequency communication techniques and components (e.g. coil antennas).

FIG. 7B tabulates the measured field strength data received from the TPMS devices 113a, 113b in respect of each interrogation location 401, 402, 403, 404. The values provided in FIG. 7B are exemplary only. It can be seen that the measured field strength varies depending on how far the respective TPMS device 113a, 113b is away from the respective interrogation location. It will be seen that both TPMS devices 113a, 113b are close enough to at least some of the interrogation locations to be responsive to the respective activation signals (in FIG. 7B it is assumed that TPMS device 113a is too far from location 403 to be responsive to its activation signal and that TPMS device 113b is too far away from location 401 to be responsive to its activation signal). The respective field strength data, in association with the respective interrogation locations, can be used to determine the circumferential position of each TPMS device 113a, 113b with respect to its wheel 103a, 103b, as described above.

Another example of the operation of the interrogation device 301 and the TPMS 111, 112, 113a, 113b, 114a, 114b in the locating mode is now described with reference to FIGS. 8A and 8B. FIG. 8A shows first and second in-line wheels 103a, 105a, each having a respective TPMS device 113a, 115a. A plurality of interrogation locations 401, 402, 403, 404 are defined with respect to the first wheel 103a and a plurality of interrogation locations 405, 406, 407, 408 are defined with respect to the second wheel 105a. Assuming that the wheels 103a, 105a are static, the interrogation device 301 is moved to each interrogation location 401, 402, 403, 404, 405, 406, 407, 408 in turn. In each interrogation location, the interrogation device 301 transmits the activation signal. In this example, the activation signal is received by each of the TPMS devices 113a, 115a and so each TPMS device 113a, 115a transmits received signal strength data to the interrogation device 301 by way of response.

FIG. 8B tabulates the measured field strength data received from the TPMS devices 113a, 115a in respect of each interrogation location 401, 402, 403, 404, 405, 406, 407, 408. The values provided in FIG. 8B are exemplary only. It can be seen that the measured field strength varies depending on how far the respective TPMS device 113a, 115a is away from the respective interrogation location. It will be seen that both TPMS devices 113a, 115a are close enough to at least some the interrogation locations to be responsive to the respective activation signals (in FIG. 8B it is assumed that TPMS device 113a is too far from locations 403, 406 and 407 to be responsive to their activation signals and that TPMS device 115a is too far away from locations 401, 404 and 405 to be responsive to their activation signals).

The respective field strength data, in association with the respective interrogation locations, can be used to determine the circumferential position of each TPMS device 113a, 115a with respect to its wheel 103a, 105a, as described above. The location of each TPMS device 113a, 115a may be determined using all of the interrogation locations 401, 402, 403, 404, 405, 406, 407, 408, or just some of them, e.g. only interrogation locations relating to the respective wheel 103a, 105a. Alternatively still, interrogation locations for one wheel may be used to perform the analysis for more than one wheel. For example, in the illustration of FIGS. 8A and 8B all of the analysis may be performed using only interrogation locations 401, 402, 403, 404, or only interrogation locations 405, 406, 407, 408. Another alternative is to use a respective subset of each wheel's interrogation locations, for example using only interrogation locations 404, 402, 408, 406, or only interrogation locations 401, 403, 405, 407 for all of the analysis.

In the illustrated examples, the respective interrogation locations for each wheel are spaced apart around the circumference of the respective wheel. Four interrogation locations are used for each wheel, each conveniently being spaced apart by 90°. This arrangement facilitates determining which tire quadrant the respective TPMS device is located in. In alternative embodiments, more or fewer interrogation locations may be used per wheel and/or with different spacings. Preferably, at least three interrogation locations are used for each wheel, or for more than one wheel.

As illustrated by the examples of FIGS. 7A, 7B, 8A and 8B, the interrogation device 301 is able to interact with more than one TPMS device when performing its locating function.

Optionally, in the case of dual wheels (e.g. wheels 103a, 103b), the interrogation device 301 may determine whether each TPMS device 113a, 113b is installed on the inner wheel or outer wheel by analysing the respective field strength data provided by each TPMS device 113a, 113b. This may be achieved by calculating, for each TPMS device 113a, 113b, an aggregate field strength value from some or all of the field strength data from the respective device 113a, 113b. The TPMS device 113a, 113b whose aggregate value indicates a higher aggregate field strength is identified as the outer wheel 103a, while the TPMS device 113a, 113b whose aggregate value indicates a lower aggregate field strength is identified as the inner wheel 103a. The aggregation may be performed by any convenient method, e.g. calculating an average field strength value and/or a cumulative field strength value. Alternatively, a representative field strength value may be determined for each TPMS device 113a, 113b, e.g. the highest received field strength value for each TPMS device, the TPMS device with the higher representative value being identified as the outer wheel.

Optionally, in the case of wheels that are in line (e.g. wheels 103a, 105a), the interrogation device 301 may determine whether each TPMS device 113a, 115a is installed on the forward wheel or rearward wheel by analysing the respective field strength data provided by each TPMS device 113a, 115a. This may be achieved by determining, for each TPMS device 113a, 115a, an aggregate or representative field strength value from the field strength data received from the respective device 113a, 115a in respect of a plurality of forward interrogation locations (e.g. some or all of the interrogation locations associated with the forward wheel 103a) or in respect of a plurality of rearward interrogation locations (e.g. some or all of the interrogation locations associated with the rearward wheel 105a). If forward interrogation locations are used, the TPMS device 113a whose aggregate or representative value indicates a higher field strength is identified as the forward wheel 103a, while the TPMS device 115a whose aggregate or representative value indicates a lower field strength is identified as the rearward wheel 105a. If rearward interrogation locations are used, the TPMS device 115a whose aggregate or representative value indicates a higher field strength is identified as the rearward wheel 105a, while the TPMS device 113a whose aggregate or representative value indicates a lower field strength is identified as the forward wheel 103a. The aggregation may be performed by any convenient method, e.g. calculating an average field strength value and/or a cumulative field strength value. Alternatively, the representative value may be the highest value for the respective TPMS device.

In cases where the interrogation device 301 is interrogating multiple TPMS devices for a wheel set in which the wheels that are displaced laterally and longitudinally (e.g. the two in-line dual wheel sets), similar aggregation or representative techniques may be used to determine the relative positions of the wheels. For example, the technique described above for in-line wheels may be used, with the aggregate or representative field strengths being used to determine wheel position. For example, the TPMS device with the highest aggregate or representative value may be deemed to be in the outer wheel associated with the selected forward or rearward interrogation locations. The TPMS device with the next highest aggregate or representative value may be deemed to be in the corresponding inner wheel of the dual wheel set. The TPMS device with the third highest aggregate or representative value may be deemed to be in the outer wheel of the other dual wheel set. The TPMS device with the lowest aggregate or representative value may be deemed to be in the corresponding inner wheel of the other dual wheel set. Such an approach may not produce accurate results depending on the relative positions of the respective TPMS device in each wheel.

Once the location analysis is complete, the interrogation device 301 may render to the user an indication of the location of the TPMS device for the or each wheel under interrogation. Conveniently this rendering may involve displaying appropriate information, e.g. graphically, on the display 306. For example the interrogation device 301 may display a graphical representation or picture of the wheel with an indicator showing the location of the TPMS device, or may display an augmented reality indicator of the TPMS location on a real-world view of the respective tire (in cases where the interrogation device 301 includes software and hardware required to support augmented reality), and/or may display or otherwise render to the user any other indication (e.g. an audio and/or visual indication including graphics, text and/or voice indications) of the location of the TPMS device. Optionally, the location of the TPMS device may be indicated with respect to a known reference point on the tire, for example with respect to the DOT code or other marking on the tire. Providing the user with this information assists the user in performing any other tasks, such as programming or diagnostics, that are required.

The interrogation device 301 may communicate the respective determined circumferential TPMS device location to the, or each, TPMS device via any of the supported communications links. In embodiments where the interrogation device 301 determines wheel position information for the, or each, TPMS device (e.g. inner wheel, outer wheel, forward wheel, rearward wheel), the interrogation device 301 may communicate this information to the relevant TPMS device via any of the supported communications links. This may be performed, for example, in a programming mode of the interrogation device 301, preferably via the transmitter/receiver 302, 206. Hence each TPMS device may be programmed with its location information. Optionally, the TPMS device location may be transmitted from the interrogation device 301 to one or more control units of the vehicle 100, for example the ECU 120. This may be achieved via a direct communications link, for example any convenient wired or wireless communication link, between the interrogation device 301 and the control unit(s) or the vehicle's CAN (controller area network), or may be achieved indirectly by communicating the TPMS device location data to a remote server (not shown) via a telecommunications network (for example comprising the internet and/or a cellular data network), the control unit(s) being configured to download the data from the server.

It will be seen that by comparing and/or otherwise analysing the signal strength data received from the, or each, TPMS device that is responsive to the activation signals issued in a given locating cycle, the interrogation device 301 is able to determine the location of the, or each, responsive TPMS device with respect to its wheel/tire and, if applicable, whether the TPMS device is in an inner or outer wheel and/or which axle the respective wheel is on (i.e. forward or rearward positioning). Depending on the embodiment, the TPMS device location may indicate a segment, e.g. a quadrant, of the respective wheel/tire, or may be more precise. The TPMS device locating method may be performed for each wheel, or each set of dual wheels, of the vehicle.

Advantageously, the interrogation device 301 stores the determined information for each wheel/tire in memory 304. Each TPMS device may also store, in any convenient memory, its determined location with respect to its wheel. To this end the interrogation device 301 may communicate the relevant location, once determined, to the respective TPMS device, using either communication link as is convenient. Subsequently the TPMS device may communicate its determined location to an interrogation device—in particular another interrogation device—to save the user having to repeat the location process.

In the illustrated embodiment, it is assumed that the interrogation locations are fixed and not only known to the interrogation device 301 but also to the user so that the user knows where to place the device 301 in order to transmit the activation signals. In alternative embodiments (not illustrated) the interrogation device 301 may be provided with a motion detecting apparatus, for example comprising one or more accelerometer, for enabling the interrogation device 301 to track its own movement around a wheel from a given starting position, and to transmit the activation signals at appropriate positions around the wheel. In such an embodiment, it is preferred that the interrogation locations are fixed and known to the device 301 to enable the device 301 to transmit the activation signal at the appropriate location.

Figure 9:
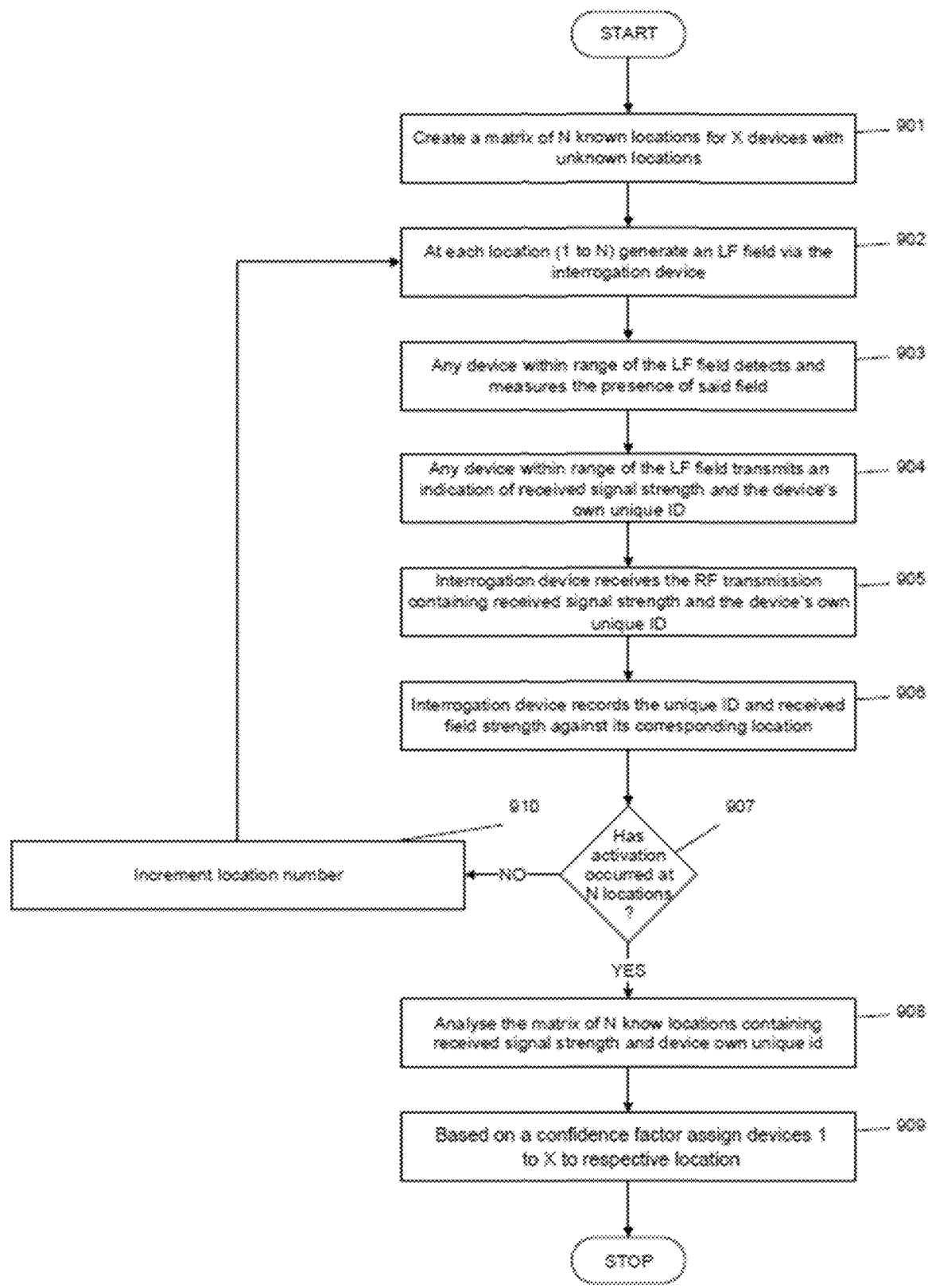
FIG. 9 shows a flowchart of an exemplary operation of the interrogation device and near-by TPMS sensors.

With reference to FIG. 9, an example of how the interrogation device 301 analyses the field strength data is described. In this example, the interrogation device 301 performs confidence-based analysis on the received field strength data.

At 901, the interrogation device 301 creates a matrix of N known locations that may be assigned to one or more TPMS device. In this example, it is assumed that there are X TPMS devices within range of the interrogation device 301 at at least one of the interrogation locations N. in this example.

The known locations N correspond with the interrogation locations described above. At 902, the interrogation device 301 is located at a respective one of the N interrogation locations and transmits the activation signal. At 903 and 904 the, or each, TPMS device within range of the interrogation device 301 responds to the received activation signal by measuring the detected field strength and transmitting the corresponding field strength data to the interrogation device 301 together with its sensor ID. At 905 and 906, the interrogation device 301 records the received field strength data for the, or each, responsive TPMS device against the current location N using the ID of the TPMS device. At 907, the device 301 determines if steps 902 to 906 have been performed for all N locations. If not then steps 902 to 906 are repeated for the next interrogation location, otherwise the device 301 proceeds to block 908. At 908 and 909, the interrogation device 301 analyses the received field strength data and assigns the, or each, responsive TPMS device to a respective one of the locations N. The analysis involves using the received field strength data in conjunction with the respective interrogation locations N and the device IDs. The analysis may employ any of the techniques described above in relation to FIGS. 7 and 8. In the present example however it is assumed that the analysis is performed based on a confidence assessment. For example, the interrogation device 301 may determine if any responsive TPMS device has returned field strength data for a given location N that warrants it being assigned to the given location N. For example, if the field strength data for a given responsive TPMS device exceeds a threshold value then the TPMS device may be assigned to the given location N. When one TPMS device has been assigned to a location N, it may be eliminated from further analysis in which a similar confidence assessment may be performed to assign the or each remaining TPMS device to a location N.

The invention is described above in the context of TPMS devices but is not limited to such. More generally, the wheel mounted device may comprise any tire monitoring device (which may be configured and equipped to monitor any one or more tire characteristic(s) of interest, e.g. pressure, temperature, motion, tire footprint and/or force, or other electronic device whose location needs to be determined, e.g. an RFID tag. The electronic device may be mounted, in use, on a wheel (including the rim or the tire) and supports wireless communication with another device that is not mounted on the wheel, especially a portable interrogation tool. In alternative embodiments, the wheel mounted device may be the same or similar to the TPMS device described herein and illustrated in FIGS. 2 and 5 except that it may have different sensors, or different combinations of sensors, or no sensors, depending on its purpose.

The invention is not limited to the embodiment(s) described herein but can be amended or modified without departing from the scope of the present invention.

The invention claimed is:

1. A method of locating at least one wheel-mounted electronic device on a wheeled vehicle, the method comprising:
    transmitting from an interrogation device a wireless signal from each of a plurality of interrogation locations;
    receiving, at said at least one wheel-mounted device and in respect of each interrogation location, the respective wireless signal;
    measuring, at said at least one wheel-mounted device and in respect of each interrogation location, a strength of the respective received wireless signal;
    transmitting, from said at least one wheel-mounted device and in respect of each interrogation location, a wireless signal indicating the measured signal strength;
    receiving, at said interrogation device said signals indicating measured signal strength;
    determining, from the received signals indicating measured signal strength, a circumferential location of said at least one wheel-mounted device with respect to a circumference of a respective wheel.

2. The method of claim 1 further comprising rendering to a user, at said interrogation device, an indication of the determined location of said at least one wheel-mounted device.

3. The method of claim 2, wherein said rendering comprises displaying the determined location on a display or as a location with respect to a reference point on a wheel.

4. The method of claim 1 wherein said transmitting from said interrogation device comprises transmitting said wireless signal using a first wireless transmitter, and wherein said first wireless transmitter comprises a low frequency (LF) wireless transmitter.

5. The method of claim 4, wherein said first wireless transmitter comprises a coil antenna.

6. The method of claim 1 wherein said receiving the wireless signal at said at least one wheel-mounted device comprises receiving the wireless signal using a first wireless receiver, and wherein said first wireless receiver comprises a low frequency (LF) receiver.

7. The method of claim 6 wherein said first wireless receiver comprises a coil antenna, the coil antenna that is part of a transponder.

8. The method of claim 1 wherein said transmitting the wireless signal indicating the measured signal strength comprises transmitting said wireless signal using a second wireless transmitter.

9. The method of claim 8 wherein said receiving said signals indicating measured signal strength comprises receiving the wireless signals using a second wireless receiver.

10. The method of claim 9 wherein said second wireless transmitter is configured to transmit in a high frequency (HF) range or at a frequency higher than the high frequency (HF) range, and said second wireless receiver is configured to transmit in the HF range or at a frequency higher than the HF.

11. The method of claim 1 wherein said measuring comprises measuring the amplitude or received signal strength indicator of the respective received wireless signal.

12. The method of claim 1 wherein said interrogation locations are spaced apart in a plane that is perpendicular to a rotational axis of the respective wheel.

13. The method of claim 1 wherein said interrogation locations are substantially coplanar.

14. The method of claim 1 wherein said interrogation locations comprise at least one set of interrogation locations defined such that the interrogation locations in each set are spaced apart around the circumference of the respective wheel.

15. The method of claim 1 further comprising, for each interrogation location, moving said interrogation device to the interrogation location, transmitting said wireless signal from the interrogation device at the interrogation location, and receiving the respective measured strength indicating signal at the interrogation location.

16. The method of claim 1 wherein said determining comprises determining, for each wheel-mounted device, a respective signal strength for each of a plurality of said interrogation locations and determining said location of the respective wheel-mounted device based on the respective signal strengths, and wherein the determining said location comprises comparing the respective signal strengths to each other, comparing the respective signal strengths to one or more threshold values, or by analysis of the respective signal strengths and the respective interrogation locations.

17. The method of claim 1 wherein determining said location of the respective wheel-mounted device comprises selecting a respective one of said interrogation locations as said location for the respective wheel-mounted device.

18. The method of claim 1 further comprising determining for each of a first and a second wheel-mounted device, respective signal strength data for each of a plurality of said interrogation locations, and determining if said first wheel-mounted device is installed in an inner wheel or an outer wheel.

19. The method of claim 1 further comprising determining for each of a first and a second wheel-mounted device, a respective signal strength for each of a plurality of said interrogation locations, and determining if said first and second wheel-mounted device is installed in a relatively forward wheel or a relatively rearward wheel based on the respective signal strengths.

20. The method of claim 1 wherein said at least one wheel-mounted device is a tire monitoring device.

21. The method of claim 1, wherein said interrogation device includes at least one motion detecting device, the method further comprising determining the location of said interrogation device using said at least one motion detecting device and transmitting said wireless signal upon determining that said interrogation device is in any one of said interrogation locations.

22. The method of claim 1, further comprising delaying transmitting said measured signal strength signal from the respective wheel-mounted device by a delay period from a reference time, wherein the length of said delay period is based on the respective measured signal strength.

23. The method of claim 1 further comprising storing said determined location in the respective wheel-mounted device.

24. The method of claim 1 wherein said transmitting said wireless signal indicating the measured received signal strength from said at least one wheel-mounted device in respect of each interrogation location includes transmitting an identifier for the respective wheel-mounted device.

25. The method of claim 1, further including transmitting said location of said at least one wheel-mounted device with respect to a respective wheel to at least one of the wheel-mounted device of the respective wheel, to a control unit of said vehicle, or to a server via a telecommunications network.

26. A system for locating at least one wheel-mounted electronic device on a wheeled vehicle, the system comprising:

an interrogation device configured to transmit a wireless signal from each of a plurality of interrogation locations; and at least one wheel-mounted device configured to receive, in respect of each interrogation location, the respective wireless signal, wherein said at least one wheel-mounted device is configured to measure, in respect of each interrogation location, a strength of the respective received wireless signal, and to transmit, in respect of each interrogation location, a wireless signal indicating the measured signal strength, and wherein said interrogation device is configured to receive said signals indicating measured signal strength and to determine, from the received signals indicating measured signal strength, a circumferential location of said at least one wheel-mounted device with respect to a circumference of a respective wheel.

* * * * *